July 31, 1956    R. A. COLBY ET AL    2,756,573
NON-AMBIGUOUS COUPLER
Filed April 26, 1954

INVENTORS
ROBERT A COLBY
BENNET J. COPELAND
HARRY M. PASSMAN
PAUL G. WULFSBERG
BY Marvin Moody
ATTORNEY United States Patent Office — 2,756,573 — Patented July 31, 1956

2,756,573
NON-AMBIGUOUS COUPLER

Robert A. Colby, Bennett J. Copeland, Harry M. Passman, and Paul G. Wulfsberg, Cedar Rapids, Iowa, assignors to Collins Radio Company, Cedar Rapids, Iowa, a corporation of Iowa Application April 26, 1954, Serial No. 425,484

1 Claim. (Cl. 64—31)

This invention relates in general to means for coupling a pair of shafts and in particular to means for allowing misalignment between the shafts.

Oftentimes, it is desirable to couple a driving shaft to a driven shaft and various couplers have been developed for this purpose. For example, the so-called Oldham coupler comprises three members with one of the members being attached to the driving shaft, another member being attached to the driving shaft and with an intermediate member being mounted between them and in slideable engagement with both of the other members so as to compensate for misalignment. The middle member is formed with slots on either side with the slots at right angles to each other. The driven and driving members respectively are formed with projections that fit in the slots. When this coupler is disassembled, the center portion is loose and will normally fall out which may be a serious disadvantage. Oftentimes shafts are coupled in complicated equipments wherein it is hard to retrieve pieces which drop.

It is an object of this invention to provide an improved coupler of this type wherein the center portion is loosely held to one of the other portions so that it will not fall when the shafts are uncoupled. At the same time, it is held loosely so that it is free to move sufficiently to compensate for misalignment of the shafts.

A feature of this invention is found in the provision for a three piece coupling device wherein two of the pieces are loosely attached together.

Figure 1:
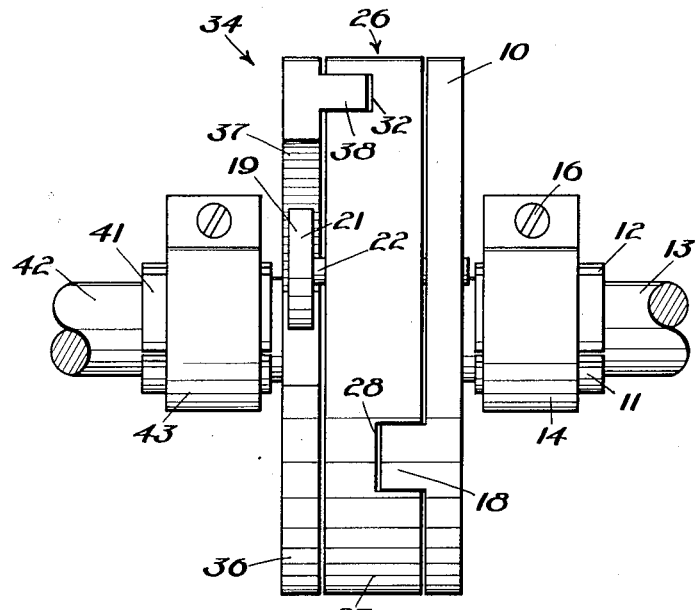
Figure 2:
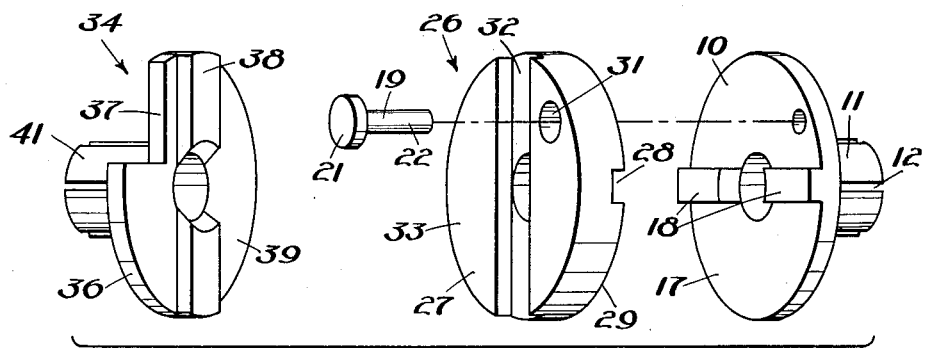

Further objects, features and advantages of this invention will become apparent from the following description and claims when read in view of the drawings, in which:

Figure 1 is an assembled view of the invention; and
Figure 2 is an exploded view.

With reference to Figure 2 which is an exploded view, it is seen that a first portion of the coupling member comprises a disc 10 which has extending from one side thereof a hollow cylindrical portion 11 which is formed with a plurality of longitudinal slots 12. As best shown in Figure 1 a shaft 13, which might be for example the driven shaft, is receivable within the hollow cylindrical portion 11 and a C-clamp 14 may be tightened about the slotted cylindrical portion 11 by screw 16 so as to clamp it to the driving shaft 13.

The face 17 of the disc 10 is formed with a projection 18 which extends transversely to the shaft 13.

A pin 19 is formed with an enlarged head 21 and has its opposite end 22 attached to the face 17 of the driven portion 10 of the coupling member adjacent the outer periphery thereof.

The center portion 26 of the coupler comprises an annular member 27 which has a first slot 28 formed on one face 29 thereof and which is adaptable for receiving the projection 18 therein. An opening 31 is formed through the portion 26 adjacent its outer periphery and the pin 19 passes therethrough. It is to be noted that the diameter of the pin 19 is much smaller than the opening 31.

A second transverse slot 32 is formed in the member 26 at right angles to slot 28 on the opposite face 33.

The third portion 34 of the coupler has a disc 36 which has a portion 37 removed in an outer edge thereof. A transverse projection 38 extends from the face 39 and is receivable within the slot 32 of the center portion 26.

A hollow cylindrical portion 41 is attached to the opposite face of the third portion 34 and receives the driving shaft 42 therein. A second C-clamp 43 may be mounted on the cylindrical portion 41 and tightened so as to lock the third portion 34 to the driving shaft 42.

When assembled, the large head 21 of the pin 19 extends beyond the confines of the center portion 26 and the cutout portion 37 of the third portion 34 prevents the third portion from engaging the pin. This is seen in the assembled view.

In operation, the first portion 10 and second portion 27 are loosely held together. They are attached by the C-clamp 14 to the driven shaft 13 and the portion 34 is attached to the driving shaft. The driven shaft and driving shaft are rotated so that the projection 38 is aligned with the slot 32 and the head 21 of the pin 19 is aligned with the cutout portion 37. Then the driven and driving shafts are moved longitudinal of each other until the projection 38 engages the slot 32 and the face 39 engages the face 33 of the second portion. It is to be noted that the head 21 of the pin 19 does not prevent contact between the faces 33 and 39. The driven and driving shafts are then locked so that they cannot move longitudinal relative to each other and the apparatus is ready for operation.

It is to be noted that the output and input shafts may be out of alignment and rotation will merely cause relative motion between the portions 10 and 34 and the center portion 27. This is true because the portion 10 is free to move in the slot 28 and the portion 34 is free to move within the slot 32. The hole 31 formed through the center portion 27 is loose enough to allow sufficient movement for this purpose and the cutout portion 37 is loose enough so that binding does not occur.

In disassembling the structure, the driving and driven shafts may move longitudinal of each other and are disconnected when the projection 38 moves out of the confines of the slot 32. It is seen that this invention provides an improved coupler wherein the center portion is loosely held to prevent it from falling.

It is to be realized, of course, that the positions of projections 18 and 38 may be interchanged with the slots 28 and 32.

Although this invention has been described with respect to particular embodiments thereof, it is not to be so limited as changes and modifications may be made therein which are within the full intended scope of the invention, as defined by the appended claim.

We claim:

A coupling means for connecting a driving and driven shaft comprising a first portion having a cylindrical hub comprising a plurality of sections, means for attaching said hub sections to the driven shaft, said first portion having a radial flange extending from the hub and having a transverse projection laterally disposed from said flange, a third portion having a cylindrical hub composed of a plurality of sections, means for attaching said hub sections to the driving shaft, said third portion having a radial flange extending from the hub and having a transverse projection laterally disposed from said flange, a second portion having transverse slots on opposite faces thereof at right angles to each other, said slots individually adapted to receive the projections of the first and third portions therein so as to permit radial misalignment between the first and third portions, the flange of the first portion having a segment removed therefrom, openings formed through the second and third portions near their peripheries, a pin with an enlarged head, the body portion of said pin extending through the opening formed in the second portion and with the end opposite the enlarged head held by the opening in the periphery of said third portion, the opening in the second portion being larger than the body of said pin but smaller than the enlarged head to thereby loosely hold said second portion to said third portion and permit radial misalignment of the shafts, said first, second, and third portions being assembled in a predetermined spatial relationship so that the enlarged head of said pin is axially aligned with the removed segment of said first portion whereby said second portion may be disconnected from said third portion with said shafts juxtaposed upon removal of the pin.

References Cited in the file of this patent

UNITED STATES PATENTS 832,877  Richards _____ Oct. 9, 1906